(12) United States Patent
Shimizu

(10) Patent No.: US 11,242,038 B2
(45) Date of Patent: Feb. 8, 2022

(54) WIPER BLADE AND WIPER ARM CONNECTING STRUCTURE AND WIPER BLADE

(71) Applicant: Nippon Wiper Blade Co., Ltd., Kazo (JP)

(72) Inventor: Yuta Shimizu, Kazo (JP)

(73) Assignee: Denso Wiper Systems, Inc., Kosai (JP)

( * ) Notice: Subject to any disclaimer, the term of this patent is extended or adjusted under 35 U.S.C. 154(b) by 128 days.

(21) Appl. No.: 16/496,711

(22) PCT Filed: Mar. 23, 2018

(86) PCT No.: PCT/JP2018/011629
§ 371 (c)(1),
(2) Date: Sep. 23, 2019

(87) PCT Pub. No.: WO2018/174230
PCT Pub. Date: Sep. 27, 2018

(65) Prior Publication Data
US 2020/0023813 A1    Jan. 23, 2020

(30) Foreign Application Priority Data

Mar. 23, 2017    (JP) .............................. JP2017-057340

(51) Int. Cl.
*B60S 1/40*    (2006.01)
(52) U.S. Cl.
CPC ..... *B60S 1/4048* (2013.01); *B60S 2001/4051* (2013.01); *B60S 2001/4054* (2013.01)

(58) Field of Classification Search
CPC ........ B60S 1/40; B60S 1/4038; B60S 1/4045; B60S 1/4048; B60S 2001/4051; B60S 2001/4054; B60S 1/3429
(Continued)

(56) References Cited

U.S. PATENT DOCUMENTS 9,260,084 B2 *   2/2016   Polocoser ............. B60S 1/4048
2012/0180244 A1 *  7/2012   Kim ...................... B60S 1/4048
15/250.31

(Continued)

FOREIGN PATENT DOCUMENTS

| JP | 2008509034 A | 3/2008 |
|---|---|---|
| JP | 2013082431 A | 5/2013 |
| KR | 1020100023942 A | 3/2010 |

*Primary Examiner* — Gary K. Graham
(74) *Attorney, Agent, or Firm* — Muncy, Geissler, Olds & Lowe, P.C.

(57) ABSTRACT

There is provided a wiper blade and wiper arm connecting structure in which a wiper blade is connected to a wiper arm by fitting a connecting portion of the wiper blade into a coupling portion of the wiper arm, which improves the aesthetic appearance of a portion where the wiper blade is connected to the wiper arm. In a wiper blade and wiper arm connecting structure, a wiper blade 1 is connected to a wiper arm 2 by fitting a clip 13 of the wiper blade 1 into a coupling portion 21 of the wiper arm 2. The coupling portion 21 includes an opening 24 through which the clip 13 is introduced into the coupling portion 21. A locking portion 26 engaging with a locking recess portion 44 on a locking piece 40 of the clip 13 is provided at a distal end 22A (an edge portion of the opening 24) of a top wall 22 of the coupling portion 21.

3 Claims, 5 Drawing Sheets

(58) Field of Classification Search
USPC .................................................... 15/250.32
See application file for complete search history.

(56) References Cited

U.S. PATENT DOCUMENTS

| | | |
|---|---|---|
| 2012/0246860 A1* | 10/2012 | Schaeuble ............. B60S 1/3849 |
| | | 15/250.32 |
| 2013/0067675 A1 | 3/2013 | Chien et al. |
| 2013/0212827 A1 | 8/2013 | Coughlin |
| 2013/0212828 A1 | 8/2013 | Coughlin |
| 2014/0182075 A1 | 7/2014 | Polocoser et al. |
| 2016/0107615 A1 | 4/2016 | Young et al. |
| 2016/0207501 A1 | 7/2016 | Avasiloaie |

* cited by examiner

WIPER BLADE AND WIPER ARM CONNECTING STRUCTURE AND WIPER BLADE

TECHNICAL FIELD

The present invention relates to an improved connecting structure for connecting a wiper blade and a wiper arm in a wiper assembly.

BACKGROUND ART

A wiper assembly used for wiping a surface of a windshield of a motor vehicle is generally constructed by pivotally connecting a wiper blade to a wiper arm which is, in turn, linked with a driving mechanism. A connecting structure of a wiper arm and a wiper blade in a wiper assembly may include a configuration in which a connecting portion of a wiper blade is housed into a box-shaped coupling portion of the wiper arm by sliding the connecting portion along the longitudinal direction of the wiper blade (slot-type connecting structure). For example, Japanese patent disclosure No. 2008-509034 (Patent Literature 1) discloses a configuration in which a connecting member (joint part) of a wiper blade is moved along the longitudinal direction to be fitted into a coupling portion, which has a U-shaped cross section and is disposed at the distal end of a wiper arm (oscillating arm), to connect the wiper blade to the wiper arm.

CITATION LIST

Patent Literature

Patent Literature 1: Japanese Patent disclosure No. 2008-509034

SUMMARY OF INVENTION

Technical Problem

In such a conventional slot-type connecting structure, the connecting portion is locked (fixed) to the coupling portion by fitting a locking portion (lock button) of the connecting portion into a fitting hole of the coupling portion. In this case, the lock button is provided on a locking piece (for example, a tongue in Patent Literature 1) of the connecting portion, and the lock button is detachably fitted into the fitting hole by deflecting the locking piece.

Such a conventional structure, however, deteriorates the aesthetic appearance of the wiper assembly, since the locking portion of the connecting portion is exposed from the fitting hole of the coupling portion to the external surface of the coupling portion. In particular, if a resin locking portion of the connecting portion is exposed outside a metallic coupling portion of a metallic wiper arm, the color of the wiper assembly is partly changed at a portion where the locking portion is disposed. As a result, this portion is very conspicuous.

In view of the foregoing problem, it is an object of the present invention to provide a wiper blade and wiper arm connecting structure in which a wiper blade is connected to a wiper arm by fitting a connecting portion of the wiper blade to a coupling portion of the wiper arm, which improves the aesthetic appearance of a portion where the wiper blade is connected to the wiper arm.

Solution to Problem

The present invention provides a wiper blade and wiper arm connecting structure for connecting a wiper blade to a wiper arm by fitting a connecting portion of the wiper blade into a coupling portion of the wiper arm, the wiper arm including an opening for introducing the connecting portion into the coupling portion, the coupling portion including a locking portion disposed adjacent to the opening, the connecting portion including an elastically deformable locking piece, and the locking piece including a locking recess portion into which the locking portion is fitted.

The coupling portion may include a top wall and a pair of side walls, the opening being disposed at a distal end portion of the coupling portion, the connecting portion being fitted into a housing portion surrounded by the top wall and the side walls through the opening. The locking portion of the coupling portion may be formed at a distal end of the top wall. The locking piece of the connecting portion may be formed on an upper wall of the connecting portion.

The locking piece may include a protruding portion disposed adjacent to the locking recess portion.

The present invention provides a wiper blade comprising a connecting portion for connecting the wiper blade to a wiper arm, the connecting portion being adapted to be fitted into a coupling portion of the wiper arm, the connecting portion including an elastically deformable locking piece, and the locking piece including a locking recess portion into which the locking portion is fitted.

The locking piece may be formed on an upper wall of the connecting portion.

Advantageous Effects of Invention

According to the wiper blade and wiper arm connecting structure or the wiper blade of the present invention, the coupling portion (for example, a coupling portion 21) of the wiper arm (for example, a wiper arm 2) includes the locking portion (for example, a locking portion 26) disposed adjacent to the opening (for example, an opening 24) into which the connecting portion (for example, a clip 13) of the wiper blade (for example, a wiper blade 1) is introduced. Therefore, the configuration for locking the connecting portion and the coupling portion does not exist on the external surface of the coupling portion. Accordingly, the aesthetic appearance of the connecting structure is improved. In addition, the locking portion is fitted into the locking recess portion (for example, a locking recess portion 44) so that the locking portion is inconspicuous. Thus, the aesthetic appearance of the connecting structure is further improved. Moreover, the locking recess portion is provided on the elastically deformable locking piece (for example, a locking piece 40). With this feature, when the connecting portion is installed into the coupling portion, the locking piece can be deflected so that the locking portion can be smoothly fitted into the locking recess portion. Accordingly, the installation can be efficiently carried out.

The locking portion is provided on the top wall (for example, a top wall 22) of the connecting portion. Accordingly, locking process can be stably carried out at a laterally central portion of the connecting structure.

The feature that the protruding portion is provided adjacent to the locking recess portion contributes to smooth installation of the connecting portion to the coupling portion, since the locking piece is deformed when the locking portion is in contact with the protruding portion.

DESCRIPTION OF EMBODIMENTS

The present invention will now be described, by way of example, with reference to the accompanying drawings.

Figure 1:
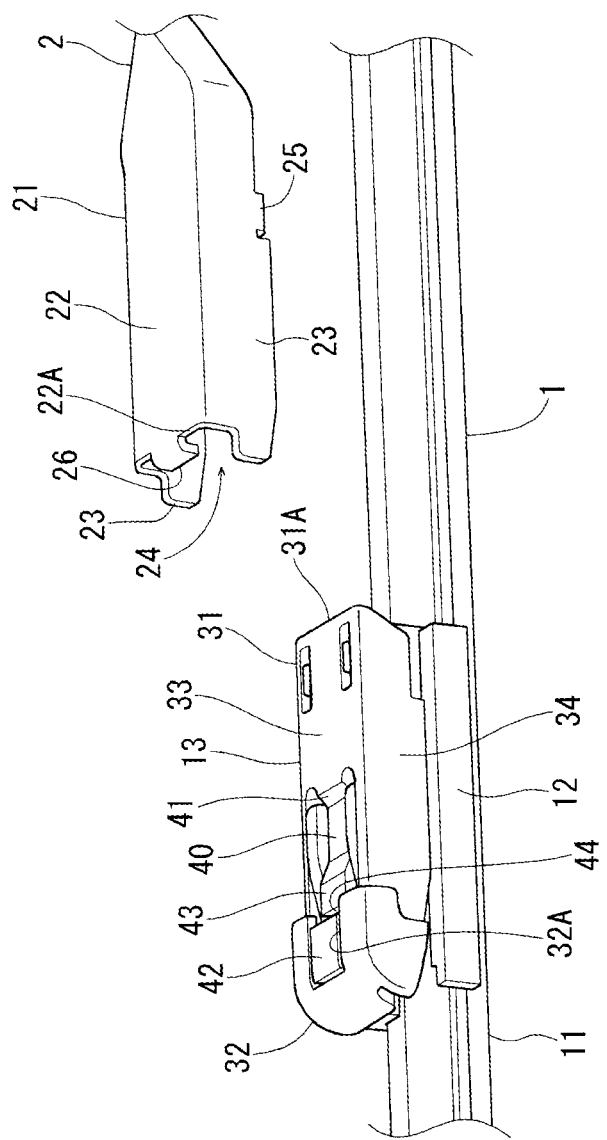
FIG. 1 is a perspective view of a wiper blade and wiper arm connecting structure according to an embodiment of the present invention, illustrating a state where a wiper blade and a wiper arm are not connected.
Figure 2:
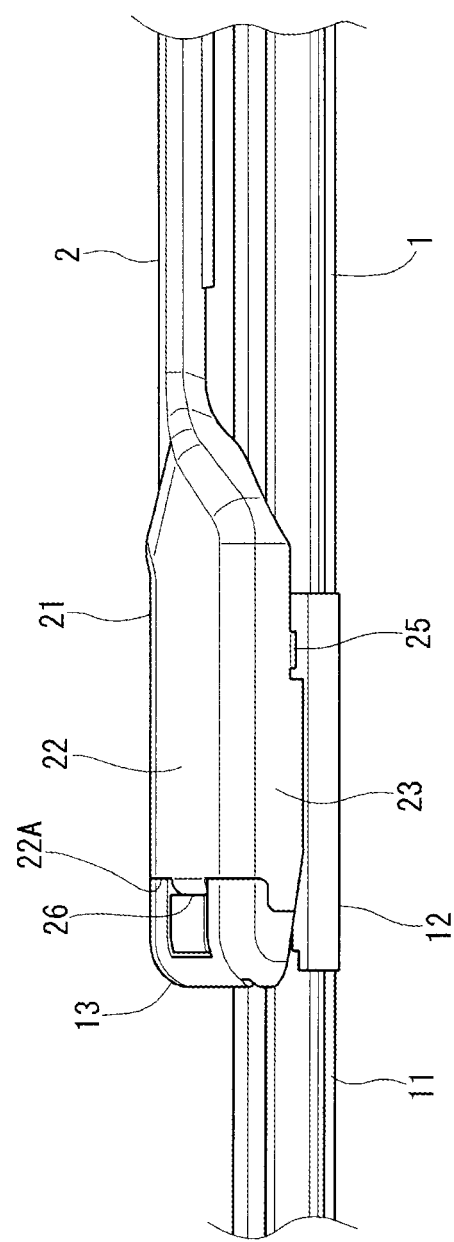
FIG. 2 is a perspective view of the wiper blade and wiper arm connecting structure of the embodiment of the present invention, illustrating a state where the wiper blade and the wiper arm are connected.

FIGS. 1 and 2 show a connecting structure for connecting a wiper blade 1 and a wiper arm 2 according to an embodiment of the present invention. FIG. 1 shows a state where the wiper blade 1 and the wiper arm 2 are not connected, while FIG. 2 shows a state where the wiper blade 1 and the wiper arm 2 are connected.

As shown in the figures, the wiper blade 1 includes: a blade main body 11 which is an elongated wiping member; a clip holder 12 fixed on the blade main body 11; and a clip (connecting member) 13 which is rotatably attached to the clip holder 12. The clip holder 12 and the clip 13 are formed, for example, with resin molding. In this embodiment, the clip 13 constitutes a connecting portion of the wiper blade 1.

The wiper arm 2 is an elongated member adapted for retaining the wiper blade 1. The wiper arm 2 includes a proximal end side (not shown) linked with a driving mechanism (not shown) of a wiper system and a distal end side which constitutes a coupling portion 21 adapted to be connected with the clip 3. The wiper arm 2 is formed, for example, of metal.

The coupling portion 21 is a member having a U-shaped cross section and includes a top wall 22 and a pair of side walls 23 disposed on both sides of the top wall 22. The clip 13 is fitted into a space surrounded by the top wall 22 and the side walls 23 (housing portion) so that the coupling portion 21 is connected to the wiper blade 1 through the clip 13. The clip 13 is introduced into the housing portion from an opening 24 formed at a distal end of the coupling portion 21 and then is fitted into the coupling portion 21 by sliding the coupling portion 21 along the longitudinal direction of the wiper blade 1. Claw portions 25 are provided at the lower end edges of the side walls 23 of the coupling portion 21, respectively, to hold the clip 3 by griping it from its underside.

A locking portion 26 is provided at a distal end 22A (an edge portion of the opening 24) of the top wall 22 of the coupling portion 21 and is a hook-shaped extended portion which can be hooked on the clip 13. The locking portion 26 is brought into engagement with a locking recess portion 44 (refer to FIGS. 3 to 5) of a locking piece 40 of the clip 13 so that the coupling portion 21 and the clip portion 13 are locked each other.

Figure 3:
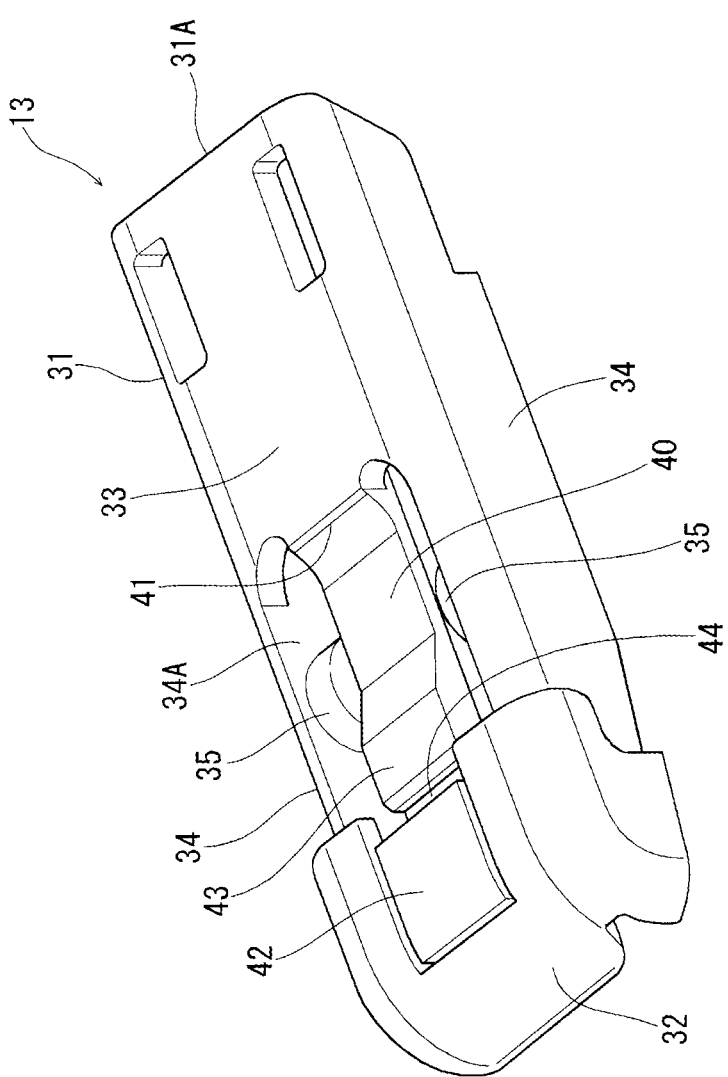
FIG. 3 is a perspective view illustrating a clip of the embodiment of the present invention.
Figure 4:
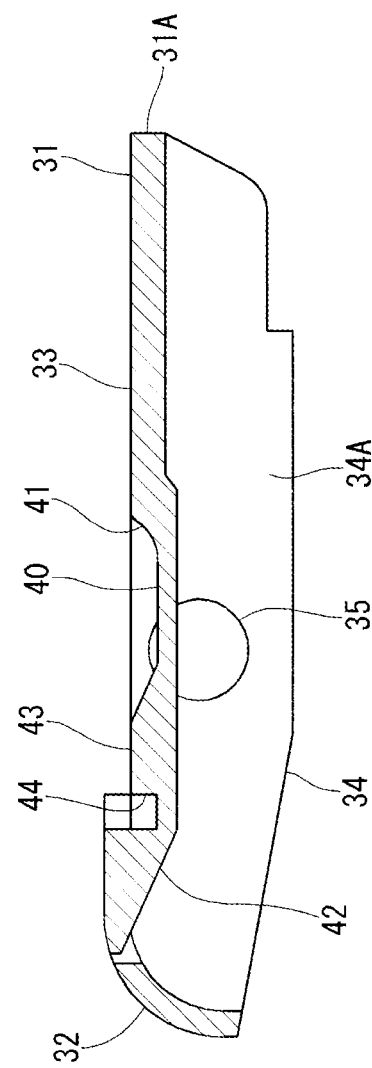
FIG. 4 is a sectional view illustrating the clip of the embodiment of the present invention.
Figure 5:
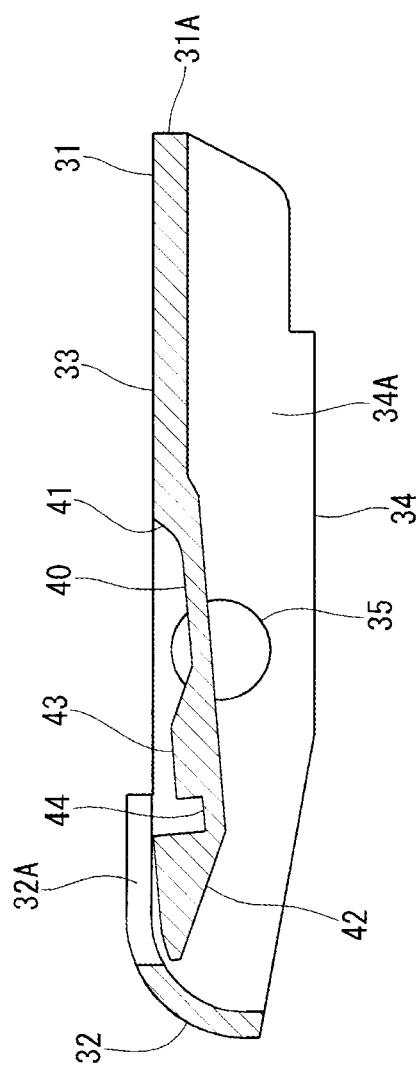
FIG. 5 is a sectional view of the clip of the embodiment of the present invention, the sectional view illustrating a state where a locking piece deflects downwards.

The clip 13 is a member formed, for example, through integral molding of resin and, as well shown in FIGS. 3 to 5, includes: a main body portion 31 having a substantially rectangular parallelepiped shape to which the coupling portion 21 of the wiper arm 2 is installed; and a front end portion 32 which has a streamline shape and is provided at the front side of the main body portion 31. When the coupling portion 21 is attached to the main body portion 31, the coupling portion 21 is flush with the front end portion 32 to form an integral shape.

The main body portion 31 includes an upper wall 33 and a pair of side portions 34 provided on both sides of the main body portion 31. A rotation shaft portion 35 for attachment to the clip holder 12 is provided on an inside surface 34A of each of the side portions 34. The clip 3 is attached to the clip holder 12 to be rotatable about the rotation shaft portions 33.

The locking piece 40 is formed by cutout on the upper wall 33 of the main body portion 31. The locking piece 40 extends forwardly from a proximal end portion 41, which is a fixed end and extends from the proximal end side of the upper wall 33, to a distal end portion 42 which is a free end. The locking piece 40 is adapted to be elastically deflectable downwards, as shown in FIG. 5. The distal end portion 42 of the locking piece 40 extends in a cutout portion 32A formed on the front end portion 32.

A protruding portion 43 protruding upwardly is provided at the rear side (proximal end side) of the distal end portion 42 of the locking piece 40 and is disposed adjacent to the distal end portion 42. Formed between the distal end portion 42 and the protruding portion 43 is a locking recess portion 44 within which the locking portion 26 of the coupling portion 21 is engaged.

When the coupling portion 21 and the clip 13 are connected, the clip 13 is introduced into the opening 24 of the coupling portion 21 from the side facing a rear end 31A of the main body portion 31. The coupling portion 21 is then moved to slide along the longitudinal direction of the wiper blade 1 so that the clip 13 is housed into the coupling portion 21.

As the connecting work of introducing the clip 13 into the coupling portion 21 proceeds as described above, the locking portion 26 of the coupling portion 21 arrives at the protruding portion 43 of the locking piece 40 and depresses the locking piece 40 downwardly. As the coupling portion 21 is moved further from this state, the clip 13 is completely housed in the coupling portion 21, and the locking portion 26 fits into the locking recess portion 44 of the locking piece 40 so that the coupling portion 21 is locked on the clip 13.

As described above, according to the connecting structure of this embodiment, the coupling portion 21 is connected to the clip 13 by means of the locking portion 26 provided at the distal end portion 22A of the coupling portion 21 (the top wall 22) of the wiper arm 2. Therefore, any configuration for locking the coupling portion 21 to the clip 13, such as locking hole, does not exist on the outer circumferential surface of the coupling portion 21 (the top wall 22 and the side walls 23). In addition, the locking portion 26 of the coupling portion 21 is fitted within the locking recess portion 44 of the clip 13. Therefore, the locking portion 26 is inconspicuous. Consequently, the aesthetic appearance of the connecting structure can be improved.

The embodiment of the present invention has been described above, but the present invention is not limited to the embodiment and can be modified as required without departing from a scope defined by the claims. For example, in the illustrated embodiment, the connecting portion is the clip 13 is attached to the wiper blade 1 through the clip holder, but the present invention is not limited thereto. For example, a connecting member attached directly to the wiper blade may be adopted. Also, a connecting portion formed as a part of the wiper blade may be adopted.

LIST OF REFERENCE NUMERALS 1 wiper blade
2 wiper arm
11 wiper blade main body
12 clip holder
13 clip
21 coupling portion
22 top wall of coupling portion
23 side wall of coupling portion
24 opening of coupling portion
25 claw portion of coupling portion
26 locking portion of coupling portion
31 main body portion of clip
32 front end portion of clip
33 upper wall of main body portion
34 side portion of main body portion
35 rotation shaft portion
40 locking piece
41 proximal end portion of locking piece
42 distal end portion of locking piece
43 protruding portion of locking piece
44 locking recess portion of locking piece

The invention claimed is:

1. A wiper blade and wiper arm connecting structure for connecting a wiper blade to a wiper arm by fitting a connecting portion of the wiper blade into a coupling portion of the wiper arm,
   wherein the coupling portion comprises an opening for introducing the connecting portion into the coupling portion,
   wherein the coupling portion comprises a locking portion disposed adjacent to the opening,
   wherein the connecting portion comprises an elastically deformable locking piece,
   wherein the locking piece comprises a locking recess portion into which the locking portion is fitted,
   wherein the opening is disposed on a longitudinal front end of the coupling portion,
   wherein the locking piece is formed by cutting out the upper wall of the connecting portion and extends from a proximal end portion as a fixed end disposed on the side of a longitudinal rear end of the coupling portion to a distal end portion as a free end disposed on the side of the longitudinal front end of the coupling portion,
   wherein the locking recess portion is disposed adjacent to the distal end portion of the locking piece, and
   wherein when the connecting portion fits into the coupling portion, a portion of the locking piece extending from the proximal end portion to the locking recess portion is disposed within the coupling portion.

2. The wiper blade and wiper arm connecting structure according to claim 1, wherein the coupling portion includes a top wall and a pair of side walls, the opening being disposed at a distal end portion of the coupling portion, the connecting portion being fitted into a housing portion surrounded by the top wall and the side walls through the opening, and
   wherein the locking portion of the coupling portion is formed at a distal end of the top wall.

3. A wiper blade comprising a connecting portion for connecting the wiper blade to a wiper arm, the connecting portion being adapted to be fitted into a coupling portion of the wiper arm,
   wherein the coupling portion comprises an opening for introducing the connecting portion into the coupling portion,
   wherein the coupling portion comprises a locking portion disposed adjacent to the opening,
   wherein the connecting portion comprises an elastically deformable locking piece,
   wherein the locking piece comprises a locking recess portion into which the locking portion is fitted,
   wherein the opening is disposed on a longitudinal front end of the coupling portion,
   wherein the locking piece is formed by cutting out the upper wall of the connecting portion and extends from a proximal end portion as a fixed end disposed on the side of a longitudinal rear end of the coupling portion to a distal end portion as a free end disposed on the side of the longitudinal front end of the coupling portion,
   wherein the locking recess portion is disposed adjacent to the distal end portion of the locking piece, and
   wherein when the connecting portion fits into the coupling portion, a portion of the locking piece extending from the proximal end portion to the locking recess portion is disposed within the coupling portion.

* * * * *